US005599565A

United States Patent [19]

Dittlo

[11] Patent Number: 5,599,565

[45] Date of Patent: Feb. 4, 1997

[54] DEVICE FOR PRESS FORMING A SHEET BLANK

[75] Inventor: Michel Dittlo, Puteaux, France

[73] Assignee: Sollac, Puteaux, France

[21] Appl. No.: 376,220

[22] Filed: Jan. 20, 1995

[30] Foreign Application Priority Data

Jan. 21, 1994 [FR] France .................................. 94 00666

[51] Int. Cl.$^6$ ............................ B29C 43/52; B29C 33/02

[52] U.S. Cl. .......................... 425/384; 425/394; 425/395; 425/397; 425/407; 425/417; 425/DIG. 14; 425/DIG. 110

[58] Field of Search .................... 425/DIG. 44, DIG. 13, 425/DIG. 14, 384, 395, 397, 398, 407, 408, 417, 555, DIG. 48, DIG. 110, 394

[56] References Cited

U.S. PATENT DOCUMENTS

| | | | |
|---|---|---|---|
| 2,907,070 | 10/1959 | Van Hartesveldt | 425/DIG. 10 |
| 3,264,392 | 8/1966 | Taplin | 425/DIG. 44 |
| 3,584,109 | 6/1971 | Meadors et al. | 425/398 |
| 4,005,967 | 2/1977 | Ayres et al. | 425/384 |
| 4,239,727 | 12/1980 | Myers et al. | 425/398 |
| 4,383,815 | 5/1983 | Kiefer et al. | 425/398 |
| 4,708,626 | 11/1987 | Sakai et al. | 425/398 |
| 4,839,126 | 6/1989 | Griesdorm | 425/398 |
| 5,204,042 | 4/1993 | James et al. | 425/DIG. 44 |

FOREIGN PATENT DOCUMENTS

| | | |
|---|---|---|
| 0165133 | 12/1985 | European Pat. Off. . |
| 0231677 | 8/1987 | European Pat. Off. . |
| 2641217 | 7/1990 | France . |
| 2641215 | 7/1990 | France . |

*Primary Examiner*—Khanh P. Nguyen
*Attorney, Agent, or Firm*—Cushman, Darby & Cushman IP Group of Pillsbury Madison & Sutro LLP

[57] ABSTRACT

The invention provides a device for press forming a sheet blank (5) of the type including a die formed by a pad (2) composed of an elastic material disposed in a retaining box (1), a lower blank holder (3) which rests on the upper part of the box (1) and on which the sheet blank (5) rests, structure for preforming the sheet blank (5) constituted by an outer slide (6) carrying an upper blank holder (**6*a*), structure for forming the sheet blank (5) constituted by a central slide acting on a plunger (7) and, in the region of heating zones of the elastic pad (2), structure (20) for regulating the temperature of the elastic pad (2) in the course of the press forming of the sheet blank (5**).

5 Claims, 5 Drawing Sheets

DEVICE FOR PRESS FORMING A SHEET BLANK

BACKGROUND OF THE INVENTION

1. Field of the Invention

The present invention relates to a device for press forming a sheet blank on a forming die of elastic material.

2. Description of the Related Art

Devices for press forming sheet blanks are disclosed in FR-A-2 641 215 and FR-A-2 641 217 and are of the type comprising a pad or cushion of an elastic material which is disposed in a retaining box and on which rests a lower blank holder, means for preforming the sheet blank constituted by an outer slide carrying an upper blank holder, and means for finally forming said sheet blank constituted by a central slide acting on a plunger.

The pad of elastic material may be a composite support composed of a substantially parallelepipedic mass based on a silicone elastomer of low Shore hardness which may be covered on its upper face and on the whole or a part of its lateral faces with a relatively thin covering of a stronger and harder material.

In the course of the preforming stage, the upper blank holder applied on the peripheral part of the sheet blank causes the flow of the mass of the elastic pad for deforming the central part of said sheet blank while imparting thereto, at the end of the preforming stage, a surface substantially equal in area to the surface of the part to be obtained.

The descent of the plunger for the final shaping of the sheet blank results in a rise in pressure in the pad and a difference of volume in said pad between the preforming stage and the shaping stage which must be compensated for so as to avoid an increase in the pressure in the pad.

Indeed, this pressure increase is incompatible with the mechanical resistance of the presses employed.

For this purpose, the device disclosed in FR-A-2 641 217 comprises means for absorbing the excess volume of the pad relative to the volume defined by the surface of the finished part to be obtained.

These absorbing means are movable in the course of the final forming of the part and this movement is regulated by a regulating means constituted for example by a multi-blade brake or a spring, or a cylinder device.

This known device permits absorbing the large, constant and defined differences of volume in the course of the first cycle of the press for a given geometry of the parts to be formed and at a given temperature.

However, this device has the drawback of failing to resolve the problem of a progressive and even a slight increase in the volume of the pad.

This increase may be due to variations in the physical properties of the material of the pad, such as for example a continuous heating of several tens of degrees generated by the deformation of the pad under the effect of the upper blank holder whose travel may represent 20% of the uncompressed height of the pad during the production of parts at a very high rate of operation of the press, i.e. higher than around ten cycles per minute.

These variations in the physical properties of the material of the pad imply successive regulations of the press which lowers the production rates.

There is known from the French patent application No. 92 06 502 in the name of the applicant, a device for press forming sheet stock on a forming die of an elastic material which comprises second means for compensating for the excess volume of the pad due to variations in the physical properties of the material of said pad in the course of the preforming and final forming of the part.

These second means for compensating for the excess volume of the pad comprise, on one hand, at least one slidable element disposed in a chamber opening onto the pad retaining box and adapted to cooperate with said pad and, on the other hand, an element for regulating the displacement of the slidable element interposed between said slidable element and the bottom of said chamber.

Although this device permits a fine compensation of the excess volume of the pad, it requires a precise regulation and does not fully satisfy the law of variation of the pressure of the pad due to the variation in the temperature as a function of the number of cycles of operation of the press. An adjustment remains essential in the course of the mass-production forming of sheet blanks.

SUMMARY OF THE INVENTION

An object of the invention is to provide a device whereby the parts may be produced with a press operating at a high rate with no need to modify the regulation of said press during the forming operations.

The invention therefore provides a device for press forming a sheet blank, of the type comprising a die formed by a pad of an elastic material, such as for example an elastomer, disposed in a retaining box, a lower blank holder which rests on the upper part of said box and on which the sheet blank rests, means for preforming the sheet blank comprising an outer slide carrying an upper blank holder, means for forming the sheet blank comprising a central slide acting on a plunger, characterized in that said device comprises, in the heating zones of the elastic pad, means for regulating the temperature of said pad in the course of the press forming of the sheet blank which are disposed in the lower blank holder.

According to other features of the invention:

- the lower blank holder comprises, on its inner part in contact with the elastic pad, means for regulating the temperature of the elastic pad in a ring provided in said inner part of the lower blank holder,
- the ring is formed of a material which has, on one hand, a thermal conductivity higher than the thermal conductivity of the other part of the lower blank holder and, on the other hand, a low coefficient of friction,
- the material of the ring is selected from steel, aluminium, copper, an aluminium alloy or a copper alloy,
- the means for regulating the temperature of the elastic pad are located under the lower blank holder in a covering placed between the elastic pad and a work sheet covering the upper face of said elastic pad,
- the means for regulating the temperature of the elastic pad are located in the lower blank holder and under said blank holder in a covering placed between the pad and a work sheet covering the upper face of said elastic pad,
- the means for regulating the temperature of the elastic pad are located in a work sheet covering the upper face of said elastic pad,
- the means for regulating the temperature of the elastic pad are formed by ducts for circulating a heat-transfer fluid,
- the pad is formed by a plurality of superimposed layers of an elastic material forming therebetween passages forming said ducts for circulating the heat-transfer fluid.

BRIEF DESCRIPTION OF THE DRAWINGS

A better understanding of the invention will be had from the following description which is given solely by way of example with reference to the accompanying drawings, in which.

DESCRIPTION OF THE PREFERRED EMBODIMENTS

Figure 1:
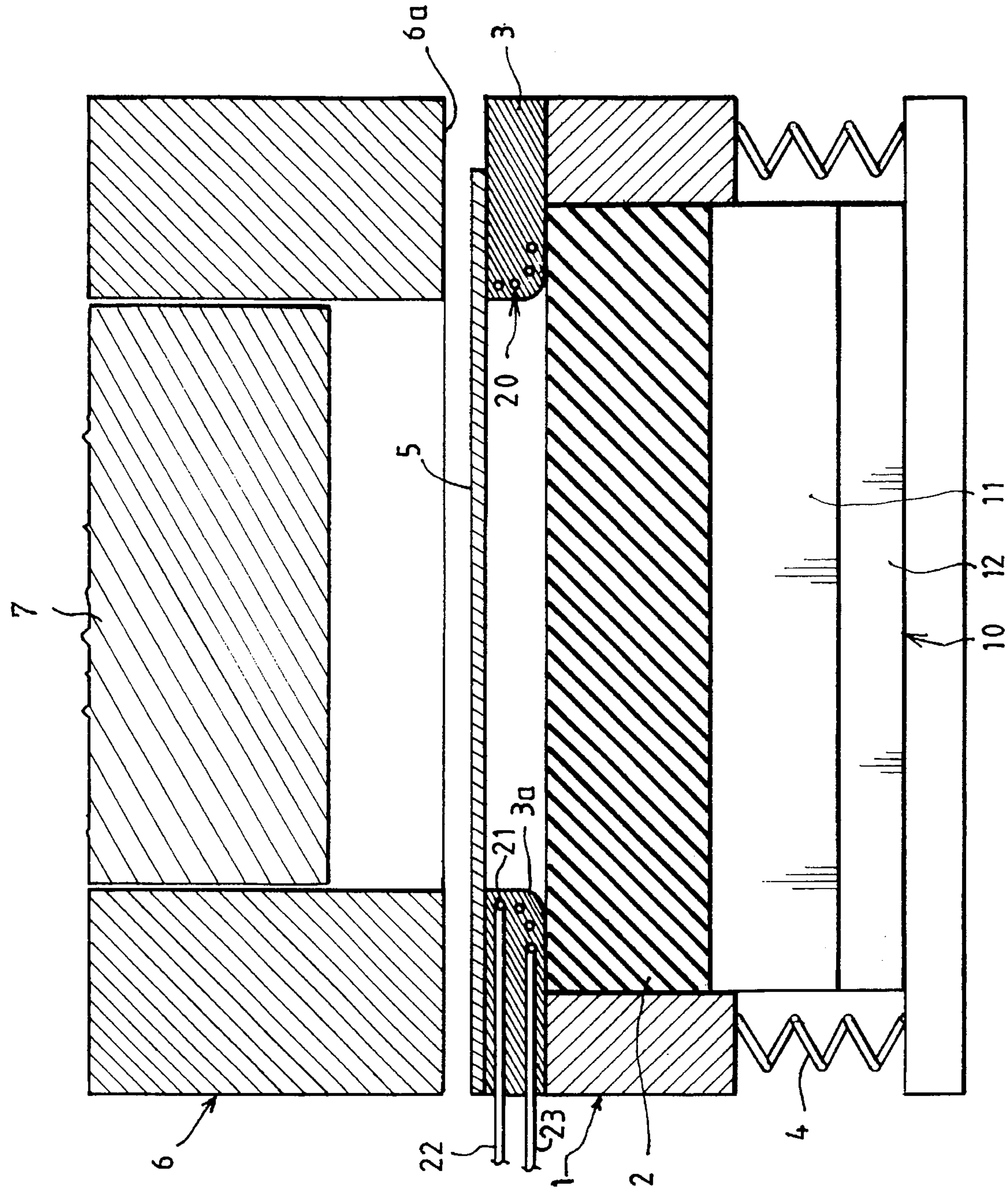
FIGS. 1, 2 and 3 are diagrammatic sectional views of a press forming device according to the invention in the course of the successive stages for forming the part.

The press forming device shown in the Figures comprises a retaining box 1 whose central part constitutes a housing for a die formed by a pad 2 of an elastic material, such as for example an elastomer.

Disposed on the upper face of the pad 2 and of the box 1 is a lower peripheral blank holder 3.

The box 1 is vertically slidably mounted and is cooperative with means 4 for regulating the displacement of said box 1 and of said lower blank holder 3.

These regulating means 4 are formed for example by a spring system or a cylinder device.

A sheet blank 5 is placed on the lower blank holder 3.

Above the box 1, the press forming device comprises a body 6 carried by an outer slide (not shown) and having a lower part constituting an upper peripheral blank holder 6*a*.

The upper peripheral blank holder 6*a* is cooperative with the lower blank holder 3 for gripping the sheet blank 5 in localized zones.

The body 6 comprises a central well into which extends a plunger 7 whose lower face constitutes an impression corresponding to the profile of the finished part to be obtained.

The device further comprises means 10 for absorbing the excess volume of the elastic pad 2, created by the application of the plunger 7, relative to the volume defined by the surface of the finished part to be obtained in the course of the final forming of said part.

These means 10 comprise, in the presently-described embodiment, a vertically movable piston 11 constituting the bottom of the retaining box 1 which has a central opening for this purpose.

The piston 11 has its upper surface applied against the pad 2 and is cooperative with means 12 for regulating the movement of the piston.

These regulating means 12, diagrammatically represented in the Figures, are constituted for example by a multi-blade brake or a spring or a cylinder device.

Figure 2:
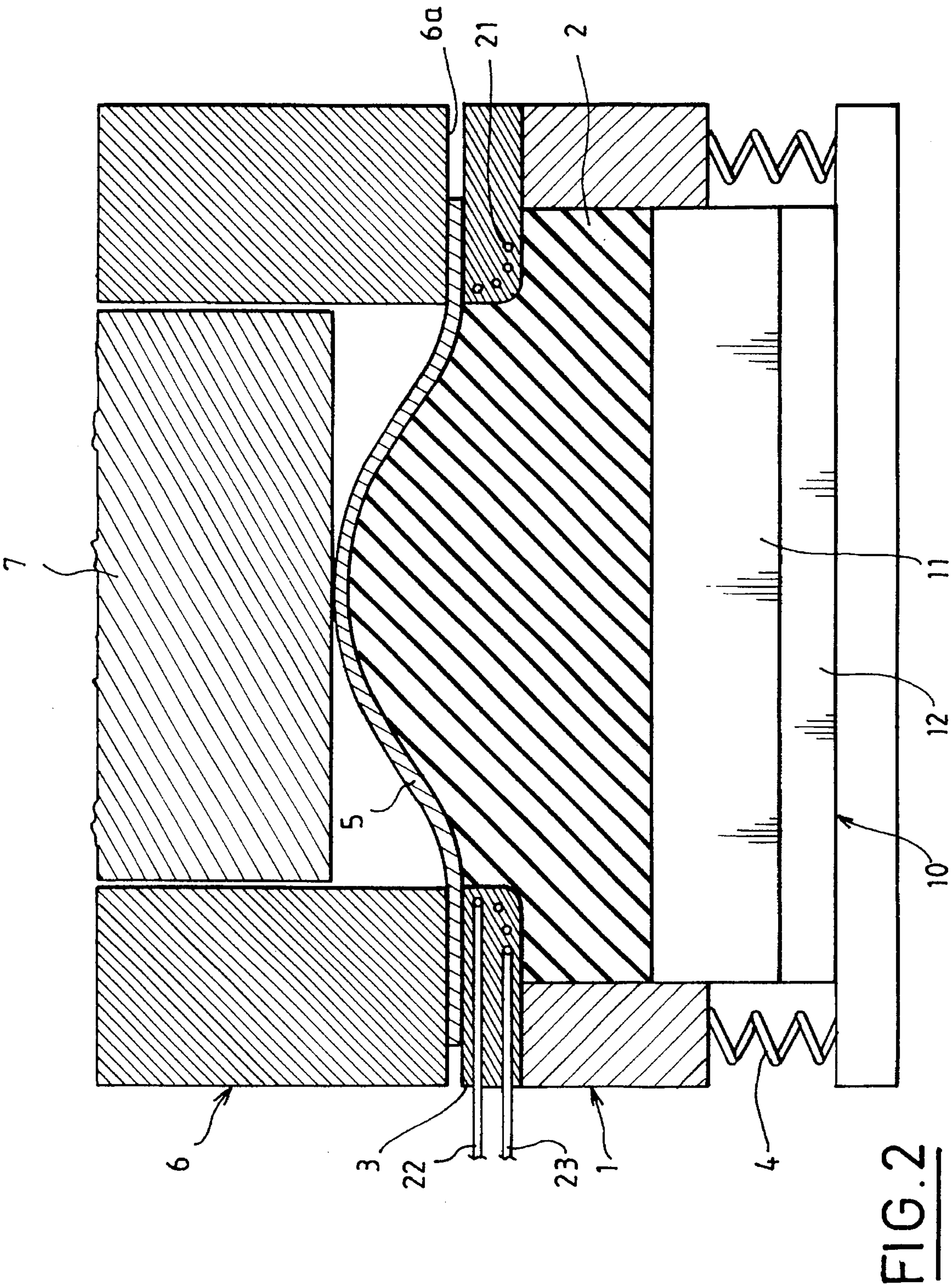

In the course of the preforming stage illustrated in FIG. 2, the body 6 is made to descend by means of the outer slide (not shown) of the press so that the upper blank holder 6*a* comes into contact with the sheet blank 5 whose peripheral zone is progressively gripped between the lower blank holder 3 and the upper blank holder 6*a*.

In the course of the descent, the upper blank holder 6*a* compresses the elastic pad 2 by reaction.

Under the effect of this peripheral action, the elastic material of the pad is made to flow and the pad acts on the central zone of the sheet blank 5 and causes the deformation of the latter.

The bulging of the central part of the sheet blank 5 is limited by the bottom of the plunger 7, thereby avoiding uncontrolled deformations.

At the beginning of the descent of the upper blank holder 6*a*, the retaining box 1 descends and compresses the regulating means 4 while the regulating means 12 prevent the displacement of the movable piston 11 under the effect of the pressure exerted by the elastic pad 2 and consequently prevents the elastic material of the pad 2 from flowing downwardly.

Figure 3:
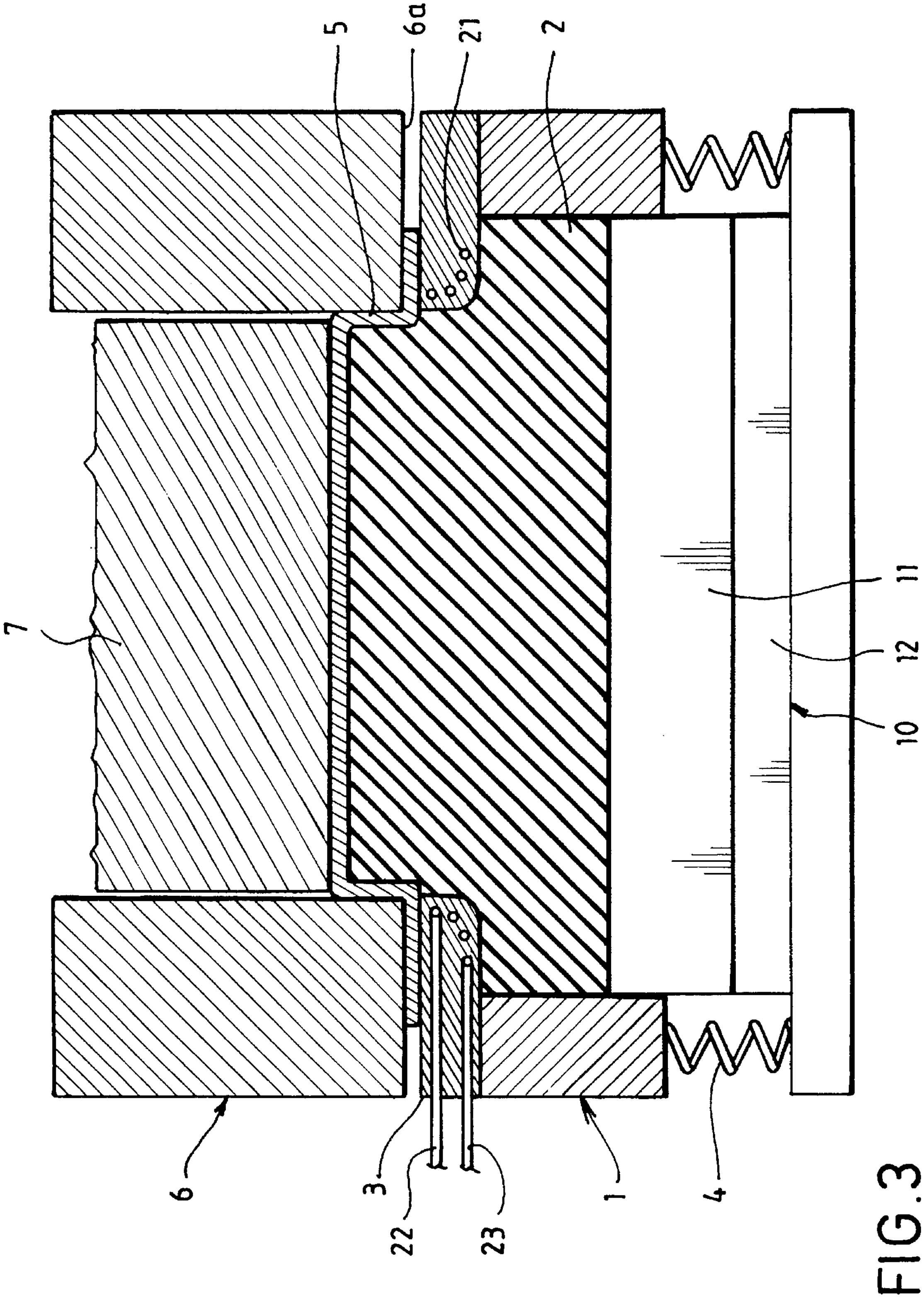

During the final stage for shaping the sheet blank 5 shown in FIG. 3, the plunger 7 descends to its lower position and controls the final forming of the central part of the sheet blank 5 preformed in the course of the preceding operation.

The stresses resulting from the bearing of the plunger 7 on the top of the sheet blank 5 cause the displacement of the sheet blank throughout the available volume and thus finally form the part with a minimum variation in thickness.

The regulating means 12 regulate the displacement of the piston 11 and consequently permit absorbing the excess volume of the elastic pad 2 produced by the application of the plunger 7.

Such a device permits absorbing constant and defined large differences in volume right from the first press cycle calculated as a function of the part to be formed.

Now, it has been found that the elastic material of the pad 2 undergoes variations in these physical properties essentially due to variations of temperature in the course of a series of operations for forming sheet blanks 5.

These temperature variations produce pressure variations which are difficult to control and are unacceptable in the mass production of parts.

For example, there occurs a continuous heating of several tens of degrees resulting from operation of the press at a high production rate generally higher than or equal to ten cycles per minute, and a partly lateral compression rate which may reach 20%.

In bodywork transfer presses a plurality of tools are juxtaposed on the same slide and a suitable regulation of the sole press forming tool on the elastic pad in the course of mass production of the parts cannot be envisaged.

The temperature variations of the pad are in large part related to the large deformations of the pad and to frictions particularly localized in the zones adjacent the lower blank holder 3 and not to the overall deformation of the total volume of the elastic pad 2.

In order to overcome these drawbacks, the press forming device according to the invention comprises, in the region of the zones of the heating of the elastic pad 2, means 20 for regulating the temperature of the elastic pad 2 in the course of the press forming of the sheet blank 5.

The zones in the neighbeurhood of the lower blank holder 3 are subjected to a localized cooling by the regulating means 20 which are, in a first embodiment shown in FIGS. 1 to 3, formed by ducts 21 for the circulation of a heat-transfer fluid, such as for example water.

The ducts 21 are incorporated in the lower blank holder 3 in the region of the inner part of the latter adapted to be in contact with the elastic pad 2.

These ducts 21 are connected to a pipe 22 supplying heat-transfer fluid and to a pipe 23 for the return of said heat-transfer fluid.

The face *3a* of the lower blank holder 3 adapted to be in contact with the elastic pad 2 is rounded so as to reduce heating by the effect of friction and may include an antifriction covering.

Figure 4:
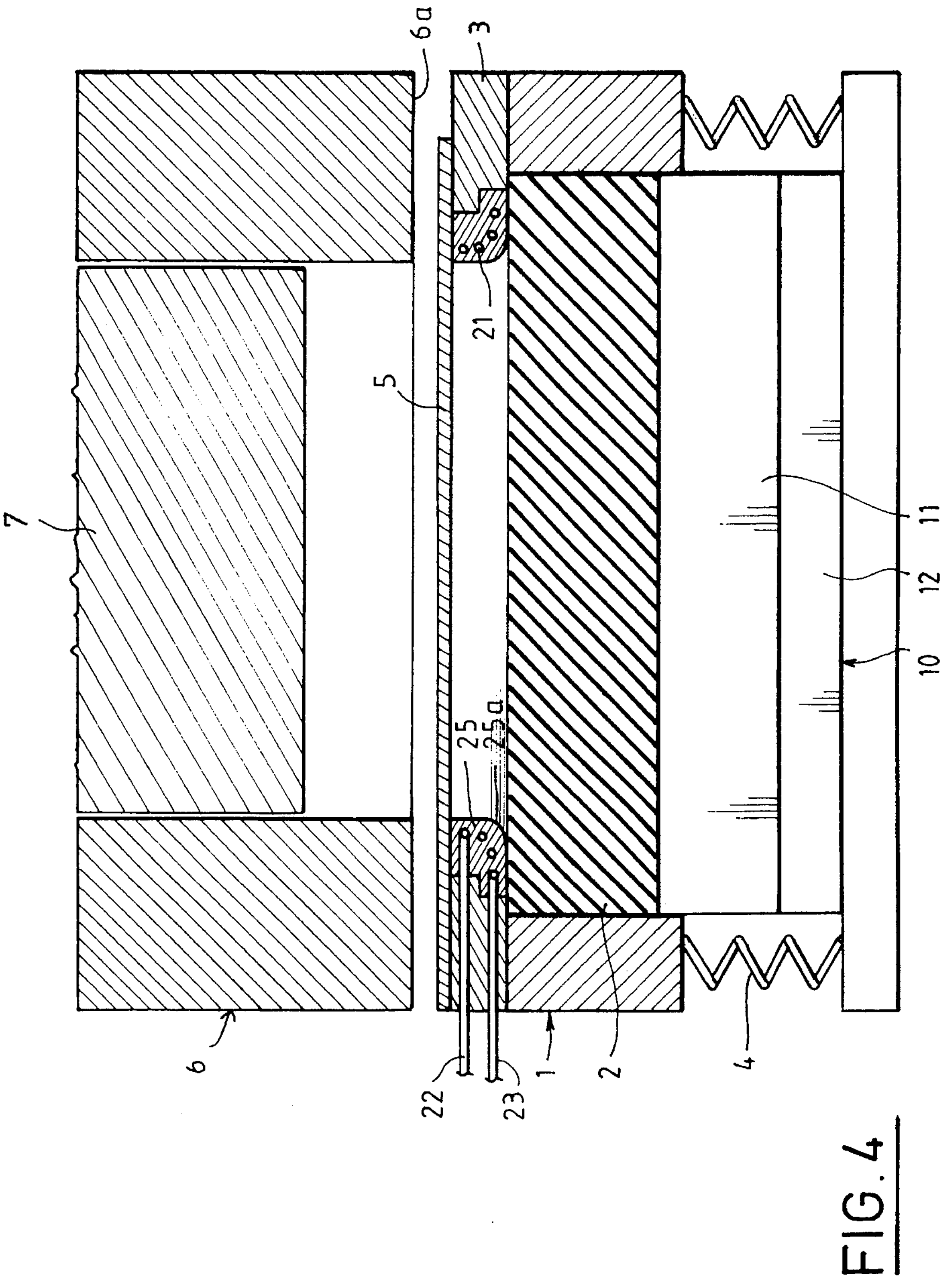
FIG. 4 is a diagrammatic sectional view of a second embodiment of the press forming device according to the invention.

In a second embodiment shown in FIG. 4, the ducts 21 for circulating the heat-transfer fluid are disposed in a ring 25 provided on the inner part of the lower blank holder 3 adapted to be in contact with the elastic pad 2.

The ring 25 is made of a material having, on one hand, a thermal conductivity higher than the thermal conductivity of the other part of the blank holder 3 and, on the other hand, a low coefficient of friction.

The face 25*a* of the ring 25 adapted to be in contact with the elastic pad 2 is rounded so as to reduce heating by the effect of friction and may include an antifriction covering.

The material of the ring 25 may be selected from steel, aluminium, copper, aluminium alloy or a copper alloy.

Figure 5:
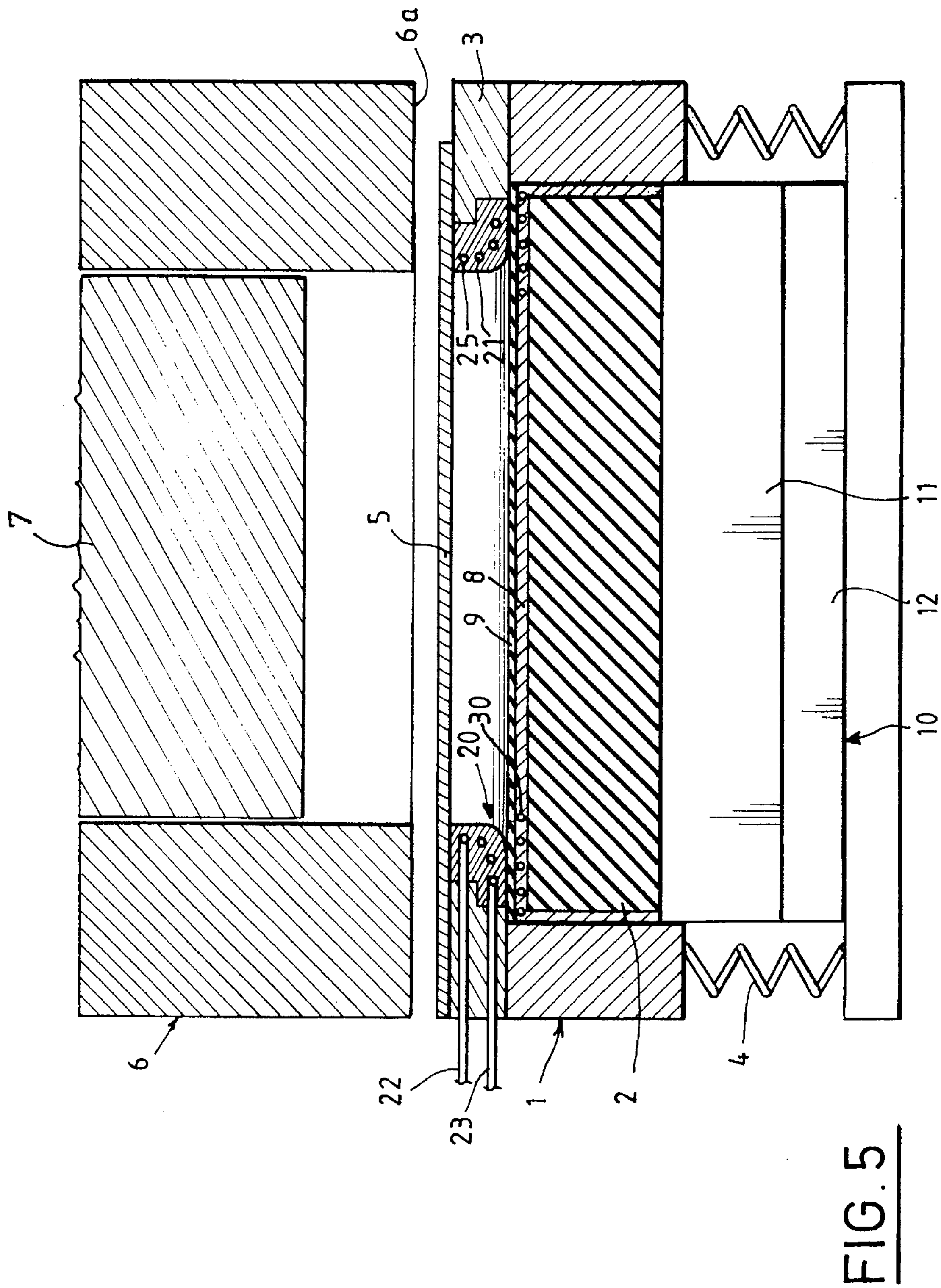
FIG. 5 is a diagrammatic sectional view of a third embodiment of the press forming device according to the invention.

In a third embodiment shown in FIG. 5, the means 20 for regulating the temperature of the elastic pad 2 may be formed by ducts 21 for the circulation of a heat-transfer fluid incorporated within the lower blank holder 3 as before and by ducts 30 for the circulation of a heat-transfer fluid disposed under the lower blank holder 3 in a covering 8 placed between the elastic pad 2 and a work sheet 9 covering the upper face of said elastic pad 2.

The ducts 31 are for example constituted by flexible pipes.

In another alternative embodiment, the means 20 for regulating the temperature of the elastic pad 2 may be formed solely by the ducts 30 incorporated within the covering 8.

In yet another alternative embodiment, the means 20 for regulating the temperature of the elastic pad 2 may be disposed in a work sheet 9 covering the upper face of said elastic pad 2.

The pad 2 may be formed by a plurality of superimposed layers composed of an elastic material and defining therebetween passages forming the heat-transfer fluid circulating ducts.

The means for regulating the temperature of the elastic pad 2 may also be employed in a device for press forming sheet blanks in which the preforming and the final forming are effected in a single stage.

The means for regulating the temperature of the elastic pad avoid a heating and large expansion of this pad and any consequental increase in the pressure in the latter, which permits employing the press forming device according to the invention in the mass production of parts.

What is claimed is:

1. Device for press forming a sheet blank comprising in combination:

a pad constituting a die and composed of an elastic material, a retaining box containing said pad, a lower blank holder which rests on an upper part of said box and has an upper face on which said sheet blank is placed, means for preforming said sheet blank comprising an outer slide, an upper blank holder carried by said outer slide, means for forming said sheet blank comprising a plunger for actuation by a central slide, said press forming device further comprising, in zones of said elastic pad which are heated in operation of said device and adjacent to said elastic pad, means for regulating the temperature of said pad in the course of the press forming of said sheet blank placed on said lower blank holder, wherein said lower blank holder comprises an inner part in contact with said elastic pad, a ring in said inner part of said lower blank holder, and said means for regulating the temperature of said pad is disposed in said ring.

2. Device according to claim 1, wherein said elastic material is an elastomer.

3. Device according to claim 1, wherein said ring is composed of a material having a thermal conductivity higher than the thermal conductivity of the rest of said lower blank holder and a low coefficient of friction.

4. Device according to claim 3, wherein said material of said ring is selected from a group consisting of steel, aluminium, copper, an aluminium alloy, and a copper alloy.

5. Device according to claim 1, wherein said means for regulating the temperature of said elastic pad are formed by ducts for circulating a heat-transfer fluid.

* * * * *